(12) United States Patent
Izworski (10) Patent No.: US 9,776,267 B1
(45) Date of Patent: Oct. 3, 2017

(54) ELECTRICAL DISCHARGE MACHINING ELECTRODE HOLDER

(71) Applicant: Johnson Technology, Inc., Muskegon, MI (US)

(72) Inventor: Mark D. Izworski, Kent City, MI (US)

(73) Assignee: JOHNSON TECHNOLOGY, INC., Muskegon, MI (US)

( * ) Notice: Subject to any disclaimer, the term of this patent is extended or adjusted under 35 U.S.C. 154(b) by 61 days.

(21) Appl. No.: 15/181,855

(22) Filed: Jun. 14, 2016

(51) Int. Cl.
*B23H 7/26* (2006.01)

(52) U.S. Cl.
CPC ........... *B23H 7/26* (2013.01); *B23H 2400/10* (2013.01); *B23H 2500/00* (2013.01)

(58) Field of Classification Search
CPC .. B23H 7/26; B23H 2400/10; B23H 2500/00; B23H 1/04; B23H 7/107; B23K 9/123
USPC .......................... 219/69.15; 137.61; 279/4.04
See application file for complete search history.

(56) References Cited

U.S. PATENT DOCUMENTS

| 5,041,709 | A | 8/1991 | Schneider et al. |
| 5,818,006 | A | 10/1998 | Habel et al. |
| 5,909,882 | A | 6/1999 | Schill |
| 7,154,063 | B2 | 12/2006 | Shih et al. |
| 7,518,081 | B2 | 4/2009 | Miyake et al. |
| 2002/0159830 | A1* | 10/2002 | Fries ...................... B23H 7/265 403/374.4 |
| 2010/0089876 | A1* | 4/2010 | Keihl ...................... B23H 7/265 219/69.15 |

FOREIGN PATENT DOCUMENTS

WO    2011116826    9/2011

OTHER PUBLICATIONS

TEK4-USA Electrode Chuck Description, dated 2012.

* cited by examiner

*Primary Examiner* — Quang D Thanh
*Assistant Examiner* — James Sims, III
(74) *Attorney, Agent, or Firm* — Warner Norcross and Judd LLP (57) ABSTRACT

An electrical discharge machining spindle for releasably holding an electrode includes a spindle body, a movable sleeve surrounding the spindle body, first and second contact elements for clamping an electrode inserted therebetween, and a locking element that is actuated by the sleeve to selectively apply pressure to at least one of the first and second contact elements to clamp the electrode.

17 Claims, 6 Drawing Sheets

ELECTRICAL DISCHARGE MACHINING ELECTRODE HOLDER

BACKGROUND

The embodiments of the present invention relate to electrical discharge machining (EDM) systems and methods, and more particularly to systems and methods for the handling of electrodes within such systems and methods.

Electrical discharge machining (EDM), also referred to as spark machining, spark eroding, burning, die sinking, wire burning, or wire erosion, is a manufacturing process whereby a desired shape is obtained using electrical discharges. Material is removed from the workpiece by a series of rapidly recurring current discharges between two electrodes. One of the electrodes is the tool, or simply the electrode, and the other of the electrodes is the workpiece.

The electrode is consumed during the EDM process. Consequently, spent electrodes must be replaced regularly with new electrodes. Because the EDM system is not operating while the electrodes are being replaced, replacing electrodes results in downtime and reduced machine utilization. The amount of downtime during the electrode replacement depends in part on how quickly the operator notices the need for a replacement and in part on the skill and the speed of the operator in making the replacement. When the EDM machining requires a relatively high rate of electrode consumption (e.g. speed drilling), machine utilization is particularly low.

Typical electrode holders are in the form of manually operated chucks having radially symmetrical jaws that tighten or expand to hold or release the electrode. Chucks often require the use of a tool or manual grasping to tighten or loosen the chuck jaws in order to insert or release the electrode. The use of a tool or manually operating the chuck to tighten/loosen the chuck can be cumbersome and increase loading and unloading time. Chucks can be improperly tightened, which can increase the risk of damaging the electrodes. In some designs, the chucks are removable from the machine for loading and unloading the electrodes, further increasing the loading and unloading time as well as increasing the risk of damaging the electrodes.

SUMMARY

The aforementioned issues are addressed by the present invention in which an EDM electrode holder reduces electrode replacement time and reduces the risk of damaging electrodes during loading, thus increasing machine utilization and decreasing costs.

The EDM electrode holder includes a spindle having an elongated spindle body having a longitudinal axis, a moveable sleeve surrounding the spindle body and extending along the longitudinal axis, a first contact element having a first electrode clamping surface, a second contact element having a second electrode clamping surface at least partially aligned with the first electrode clamping surface of the first contact element, and a locking element that is actuated by the sleeve to selectively apply pressure to at least one of the first and second contact elements. The sleeve is moveable between an open position in which the first and second electrode clamping surfaces of the first and second contact elements are released and a clamping position in which at least a portion of the first and second electrode clamping surfaces of the first and second contact elements are positioned to clamp an electrode. In the clamping position, the sleeve applies pressure to the locking element to force the locking element against at least one of the first and second contact elements, and in the open position the sleeve releases the pressure applied to the locking element.

According to another embodiment of the invention, an EDM spindle for releasably holding an electrode includes an elongated spindle body having a longitudinal axis, a moveable sleeve surrounding the spindle body and extending along the longitudinal axis, a first contact element having a first electrode clamping surface comprising a planar surface, and a second contact element having a second electrode clamping surface comprising a groove extending along the longitudinal axis and configured to receive an electrode therein, the second electrode clamping surface at least partially aligned with the first electrode clamping surface of the first contact element. The sleeve is moveable between an open position in which the planar surface of the first contact element is released from the second electrode clamping surface and a clamping position in which at least a portion of the first and second electrode clamping surfaces of the first and second contact elements are positioned to clamp an electrode between the planar surface of the first contact element and the groove of the second contact element.

In another embodiment, a method of releasably holding an electrode in an EDM spindle includes moving the sleeve relative to the spindle body along a longitudinal axis of the spindle body into an open position to decrease a pressure applied to the pair of contact elements by the locking element to thereby release the pair of contact elements, inserting an electrode between the pair of contact elements, and moving the sleeve along the longitudinal axis into a clamping position to increase a pressure applied to the pair of contact elements by the locking element, the increased pressure moving at least one of the pair of contact elements toward the other to clamp an electrode. Subsequent to clamping the electrode, the sleeve is moved into the open position again to decrease the pressure applied to the pair of contact elements by the locking element to release the electrode clamped between the pair of contact elements.

The embodiments of the invention can provide a number of advantages. Firstly, the system reduces machine downtime. Secondly, the system reduces the risk of damage to the electrodes that may occur during manual handling. Thirdly, the system reduces the time required to replace an electrode by removing the need to manually tighten and loosen manual chucks. Fourthly, the system reduces possible health risks to an operator in view of the reduced exposure to the EDM environment.

These and other advantages and features of the invention will be more fully understood and appreciated by reference to the description of the current embodiment and the drawings.

DESCRIPTION

I. System

Figure 1:
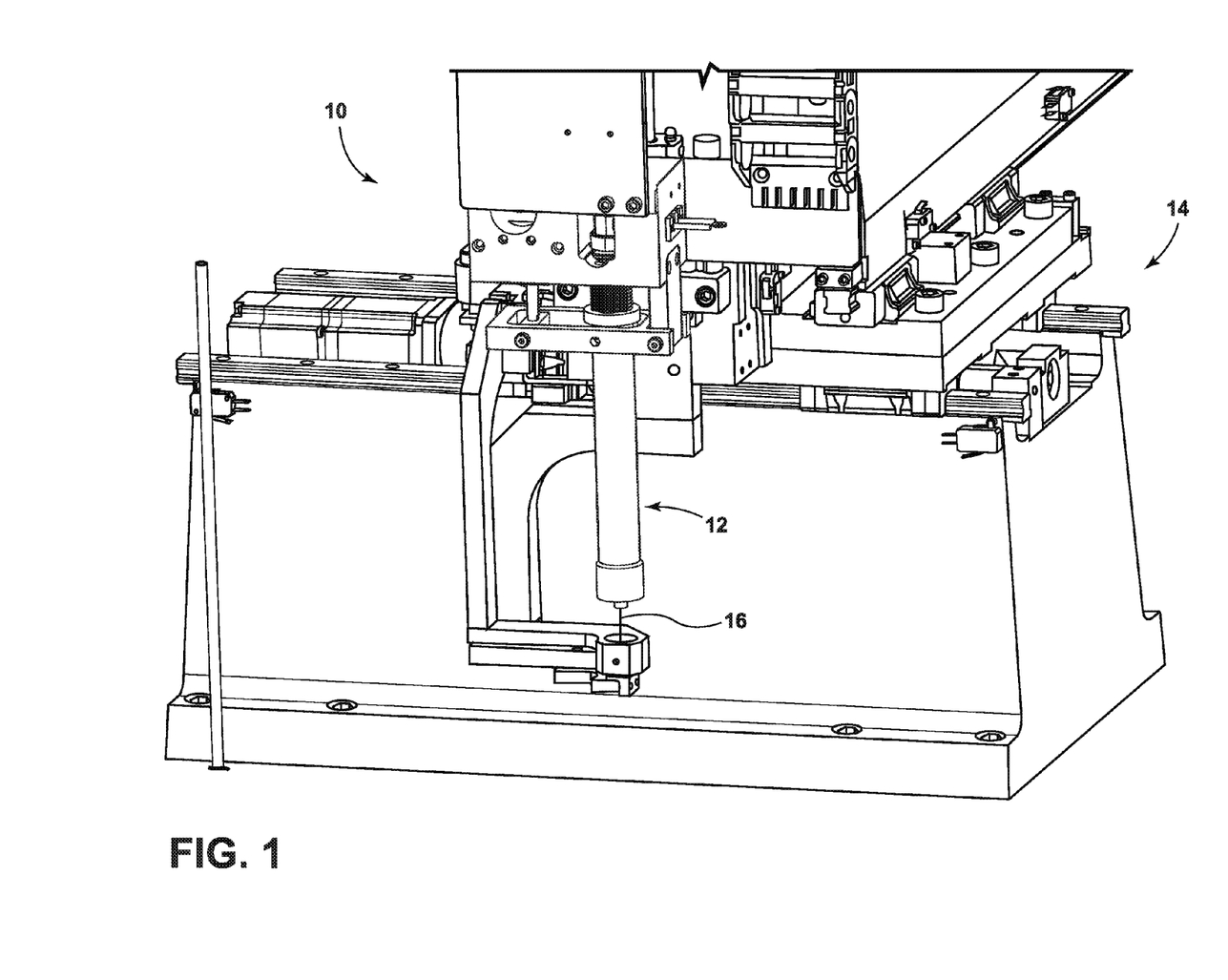
FIG. 1 is a perspective view of an EDM machine incorporating an electrode holder according to an embodiment of the invention.

An electrical discharge machining (EDM) machine constructed in accordance with a current embodiment of the invention is illustrated in the drawings and designated 10. With reference to FIG. 1, the EDM machine 10 includes a spindle 12 and a spindle transport mechanism 14. The spindle 12 releasably holds an electrode 16 for use in removing material from a workpiece. The spindle transport mechanism 14 moves the spindle 12 in the X, Y, and Z directions and is also referred to as an XYZ tool jig base. The EDM machine 10 can include additional components, such as a support frame, a workpiece support, a control system operatively connected with one or more components of the EDM machine 10 to control their movement, and other elements known in the EDM art, the details of which are not necessary for a complete understanding of the embodiments of the invention.

Figure 2:
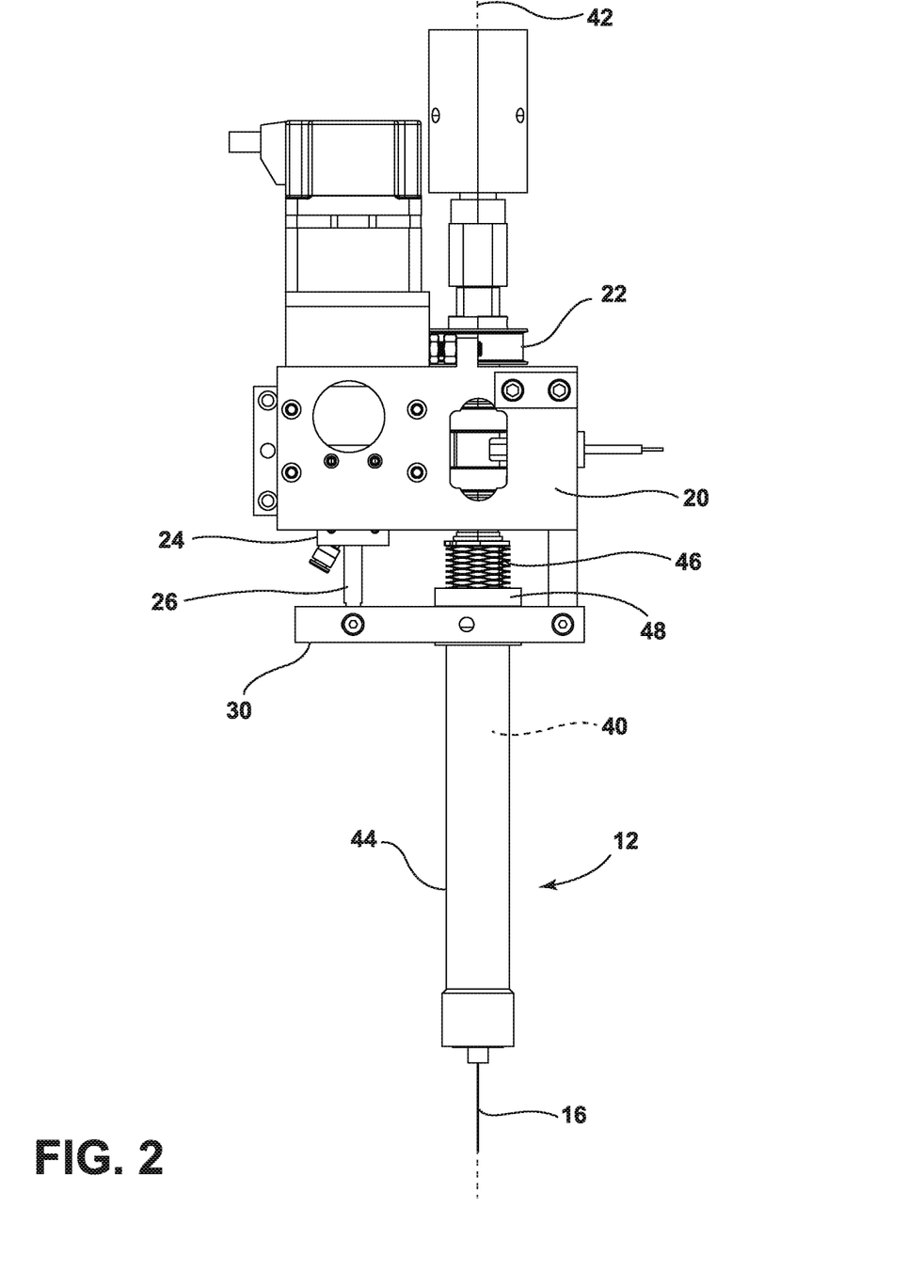
FIG. 2 is a front view of a portion of the EDM machine including a spindle incorporating the electrode holder according to an embodiment of the invention.

Referring now to FIG. 2, the EDM machine 10 includes a housing 20 for supporting the spindle 12 and additional components relative to the spindle 12. For example, the housing 20 can support a drive system 22 that is operatively connected with the spindle 12 to selectively rotate the spindle 12. The housing 20 can also support pneumatic cylinder 24 having a piston rod 26 that is coupled with a frame 30. The spindle 12 can include a spindle body 40 (FIG. 3) having an elongated shape extending along a longitudinal axis 42 oriented along the length of the electrode 16. A sleeve 44 at least partially encompasses the spindle body 40 and extends along at least a portion of the length of the spindle body 40. The spindle 12 further includes a biasing element 46, such as a spring, which is received on the spindle body 40 for biasing the sleeve 44 relative to the spindle body 40. The sleeve 44 can include a rim 48 which is configured to engage an adjacent portion of the frame 30 for selectively moving the sleeve 44 relative to the spindle body 40.

Figure 3:
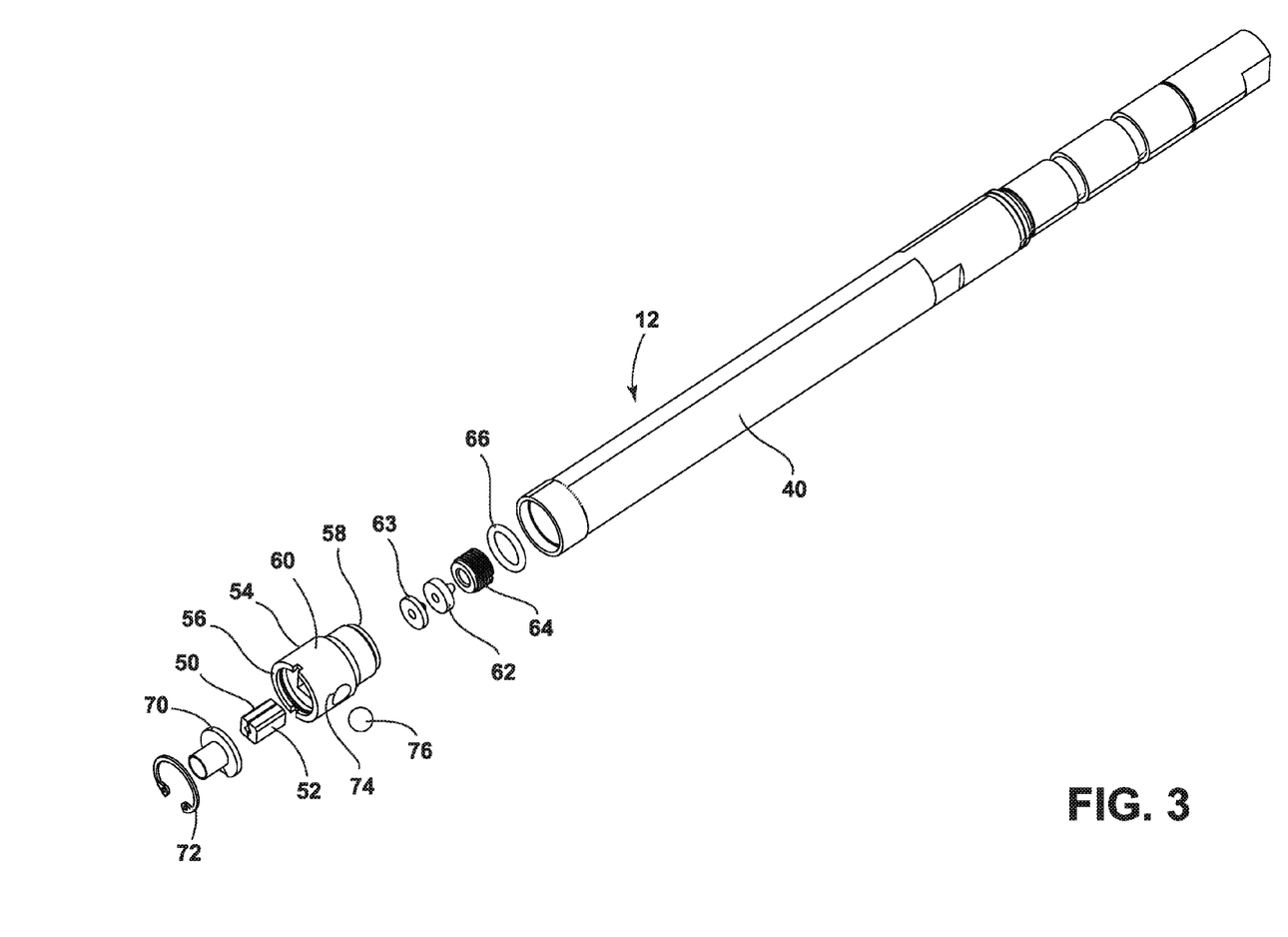
FIG. 3 is an exploded view of the spindle.

With reference to FIG. 3, the spindle 12 further includes a pair of first and second contact elements 50, 52 which are configured to receive the electrode 16 therebetween to releasably hold the electrode 16 relative to the spindle body 40. The pair of contact elements 50, 52 can be received within a spindle collar 54 which is coupled with an open end of the spindle body 40. The spindle collar 54 includes a first open end 56, connected with a second open end 58 by a side wall 60. An electrode seal 62 is received within the second open end 58 of the spindle collar 54 for forming a seal around the electrode 16. Additional components, such as a seal spacer 63, a set screw 64, and an O-ring 66 can also be provided within the second open end 58 to seal the electrode 16 and to couple the spindle collar 54 with the spindle body 40.

The spindle 12 can optionally include an electrode guide 70 for guiding the electrode 16 to the pair of contact elements 50, 52. The electrode guide 70 is received within the first open end 56 of the spindle collar 54 adjacent the contact elements 50, 52 and a snap ring 72 can be provided for holding the electrode guide 70 in place within the spindle collar 54. The electrode guide 70 and snap ring 72 can function together to secure the contact elements 50, 52 within the spindle collar 54. However, if the electrode guide 70 is not used, alternative retainers, such as a washer or spring retainer can be used to hold the contact elements 50, 52 within the spindle collar 54.

The spindle collar 54 can also include at least one aperture 74 within the side wall 60 that is at least partially aligned with one of the contact elements 50, 52. The aperture 74 can be configured to receive a locking element 76 which selectively applies a clamping pressure to the adjacent contact element 50, 52 to press the adjacent contact element 50, 52 toward the other contact element 50, 52 to clamp the electrode 16 therein.

Figure 4:
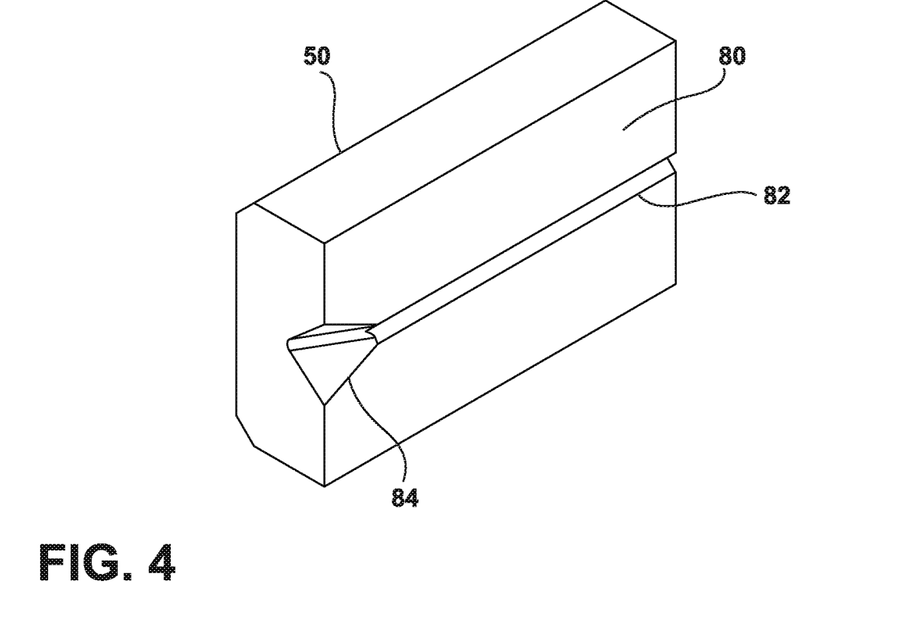
FIGS. 4-5 are perspective views of first and second contact elements, respectively, according to an embodiment of the invention.
Figure 5:
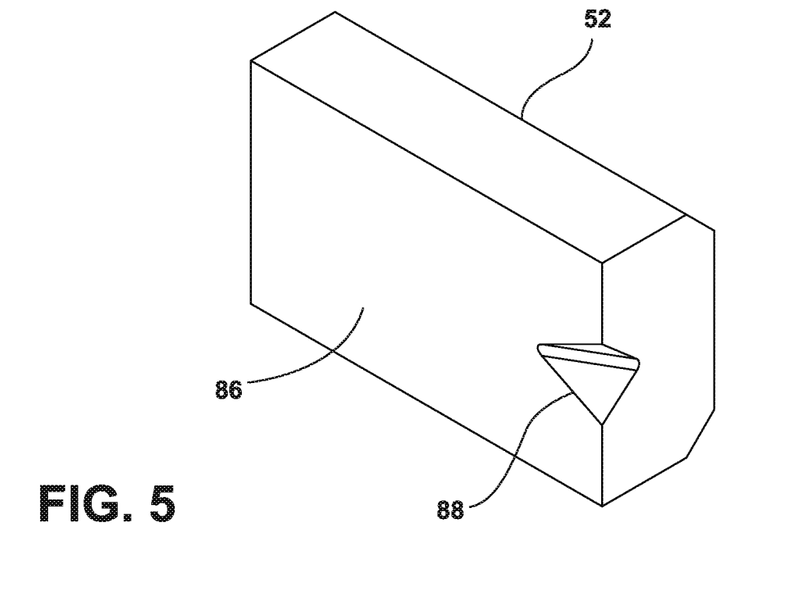

FIGS. 4 and 5 illustrate the pair of first and second contact elements 50 and 52, respectively. As shown in FIG. 4, the first contact element 50 includes a first clamping surface 80 having a groove 82 formed therein that is configured to receive an electrode 82 therein. The first clamping surface 80 can also be provided with a first cavity 84 having angled walls that taper toward the groove 82 for guiding the electrode 16 into the groove 82. As illustrated in FIG. 5, the second contact element 52 can include a second clamping surface 86 that is generally planar. The second clamping surface 86 can also include a second cavity 88 at one end having angled walls that taper toward a center of the second clamping surface 86. The second cavity 88 in the second clamping surface 86 can be configured to be generally aligned with the first cavity 84 when the first and second contact elements 50 and 52 are assembled within the spindle 12. In this manner, the first and second cavities 84 and 88 in the first and second clamping surfaces 80 and 86, respectively, can cooperate to guide the electrode 16 into the groove 82.

While only the first contact element 50 is illustrated as having a groove 82 therein, it will be understood that the second contact element 52 can have a similar groove formed therein either in addition to or as an alternative to the first contact element 50. In another example, only one of the first and/or second contact elements 50, 52 or neither can include the cavity 84, 88 for guiding the electrode 16 into the groove 82.

Figure 6:
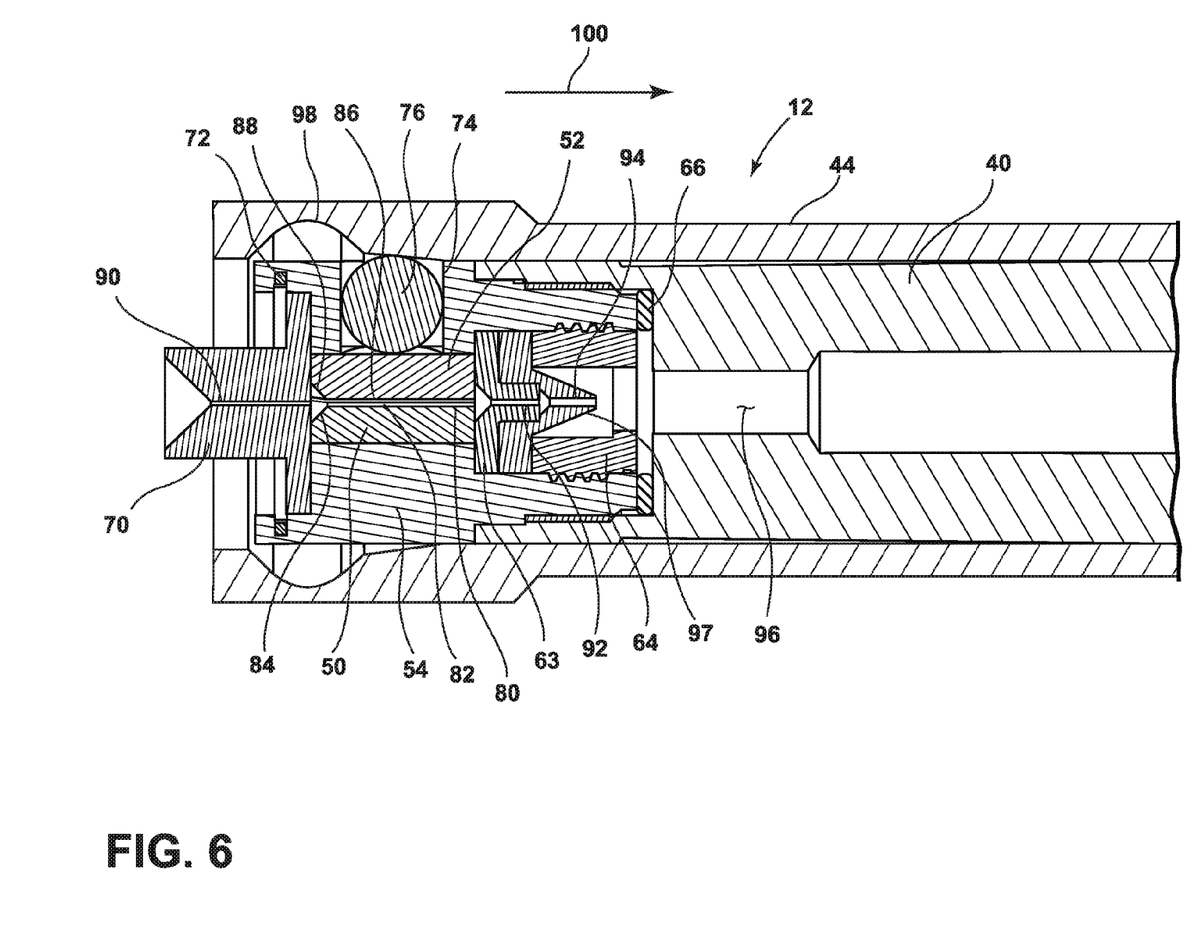
FIG. 6 is a cross-sectional view of a portion of the electrode holder in a clamped condition according to an embodiment of the invention.

Referring now to FIG. 6, when the elements of the spindle 12 are assembled, the first and second contact elements 50, 52, the electrode seal 62, the optional seal spacer 63, and the electrode guide 70 are aligned such that the electrode 16 can be selectively clamped by the first and second contact elements 50, 52 and sealed with the electrode seal 62. The electrode guide 70 can include a passageway 90, which can optionally include an inwardly tapered entry for guiding the electrode 16 to the passageway 90, through which the electrode 16 can travel to the first and second contact elements 50, 52. Similarly, the seal spacer 63 can include a passageway 92, which can optionally include an inwardly tapered entry, through which the electrode 16 can travel to the electrode seal 62.

Still referring to FIG. 6, the electrode seal 62 can include a passageway 94, which can also optionally include an inwardly tapered entry, which is configured to allow the electrode 16 to pass through to a flushing chamber 96 provided within the spindle body 40. The electrode seal 62 can have a generally cone-shaped body 97 that receives the electrode 16 and extends into the flushing chamber 96. Fluid supplied to the flushing chamber 96 impacts the cone-shaped body 97 and applies pressure to the cone-shaped body 97 of the electrode seal 62 to facilitate forming a seal around the electrode 16 inserted therethrough. The sleeve 44 can include a recess 98 on an interior surface thereof that can be selectively aligned with the locking element 76 to allow the locking element 76 to move relative to the first and second contact elements 50, 52.

II. Operation

An exemplary method of selectively holding and releasing an electrode 16 from the spindle 12 is now described. With reference to FIG. 6, the sleeve 44 can be moved along the spindle body 40 in the direction illustrated by arrow 100 to an open position in which the recess 98 is at least partially aligned with the locking element 76, as illustrated in FIG. 7.

Figure 7:
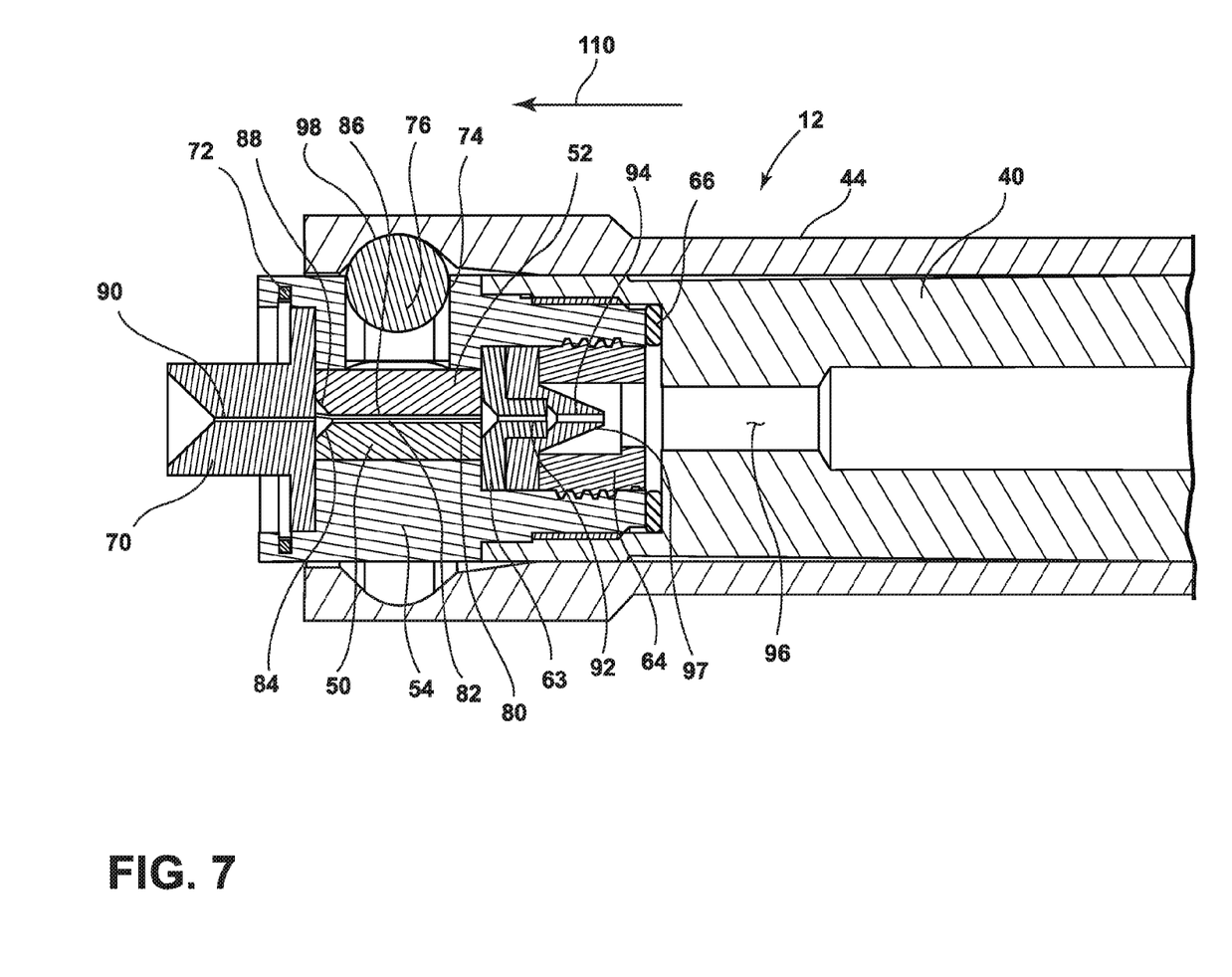
FIG. 7 is a cross-sectional view of a portion of the electrode holder in an open condition according to an embodiment of the invention.

With continued reference to FIG. 7, when the sleeve 44 is in the open position, the locking element 76 is no longer being pressed against the second contact element 52 by the sleeve 44. This decrease in pressure on the second contact element 52 releases the second contact element 52 and allows the position of the second contact element 52 to shift within the spindle collar 54 such that a space between the first and second clamping surfaces 80 and 86 of the first and second contact elements 50 and 52 increases. The space between the first and second clamping surfaces 80 and 86 is sufficient to receive the electrode 16 therebetween. The movement of the second contact element 52 may only be minor, as a large gap is not necessarily needed in order to facilitate a smooth removal and insertion of the electrode 16.

The electrode 16 can be inserted through the passageway 90 in the electrode guide 70 which is aligned with the groove 82 in the first clamping surface 80. The cavities 84 and 88 in the first and second contacts 50, 52 can facilitate guiding the electrode 16 from the passageway 90 of the electrode guide 70 to the groove 82. The electrode 16 can travel through the first and second contacts 50, 52 to the electrode seal 62 through the seal spacer 63 until at least a portion of the electrode 16 extends into the flushing chamber 96. The electrode 16 can be removed by withdrawing the electrode 16 in the opposite direction as just described.

Referring again to FIG. 2, the sleeve 44 can be moved into the open position pneumatically by the pneumatic cylinder 24. A source of gas, such as compressed air (not shown), can be fluidly coupled with the pneumatic cylinder 24 for selectively supplying a gas to the pneumatic cylinder 24. The source of gas can include one or more valves that are operably coupled with a controller (not shown) that receive input from a suitable user interface, such as a manually operated switch or a computer-assisted interface, for controlling the flow of gas to the pneumatic cylinder 24. When the controller receives an input indicating that the sleeve 44 is to be moved into the open position, the controller controls the source of gas to supply gas to the pneumatic cylinder 24 to cause the piston rod 26 to retract. As the piston rod 26 retracts, the frame 30 is drawn upward, which in turn draws the sleeve 44 upward into the open position against the bias of the biasing element 46 due to the engagement between the sleeve rim 48 and the frame 30.

Once the sleeve 44 is in the open position, a previously clamped electrode 16 can be removed from the spindle 12 and a new electrode 16 can optionally be loaded into the spindle 12. Electrodes 16 can be inserted into and/or removed from the spindle 12 manually by hand or automatically using an automated electrode changer, such as that disclosed in U.S. Pat. No. 9,314,860, entitled "Electrical Discharge Machining Automated Electrode Changer," issued Apr. 19, 2016, the content of which is incorporated herein in its entirety.

Referring again to FIG. 7, to secure an electrode in the spindle 12, following insertion of an electrode 16 between the contact elements 50, 52, as described above, the sleeve 44 can be moved relative to the spindle body 40 in the direction indicated by arrow 110 to the clamping position illustrated in FIG. 6. When the controller receives input indicating that the sleeve 44 is to be moved into the clamping position, the controller controls the source of gas to supply gas to the pneumatic cylinder 24 to cause the piston rod 26 to extend and lower the frame 30 back into the resting position illustrated in FIG. 2. In the resting position, the frame 30 is no longer pressing the sleeve 44 against the bias of the biasing element 46, which allows the biasing element 46 to press the sleeve 44 downward relative to the spindle body 40 into the clamping position illustrated in FIG. 6.

Referring again to FIG. 6, in the clamping position, the sleeve 44 applies pressure to the locking element 76 which forces the locking element 76 to press against the second contact element 52. Pressure from the locking element 76 forces the second contact element 52 to shift toward the first contact element 50, thereby clamping the electrode 16 which had been previously inserted therein. The size of the electrode 16, the size of the groove 82, and the distance the second contact element 52 moves when the locking element 76 is pressed against the second contact element 52 can be configured to provide a desired amount of clamping pressure to the electrode 16 to hold the electrode 16 within the spindle 12. In this manner, the second clamping surface 86 can apply pressure to the electrode 16 to clamp the electrode 16 within the groove 82 of the first clamping surface 80.

The cone-shaped body 97 of the electrode seal 62 allows the passageway 94 of the electrode seal 62 to be sized so as to allow the electrode 16 to pass through with little to no resistance to facilitate loading and unloading the electrode 16. When in use, pressure from the flushing fluid supplied to the flushing chamber 96 impacts the cone-shaped body 97 of the electrode seal 62, sealing the electrode seal 62 against the electrode 16.

While the embodiments are described in the context of having the second contact element 52 with the planar clamping surface 86 be movable for clamping and releasing an electrode inserted between the first and second contact elements 50, 52, it is also possible that the spindle 12 can be configured such that the first contact element 50 with the groove 82 is movable for clamping and releasing the electrode 16. In still another example, the spindle collar 54 can include a second aperture 74 and a corresponding second locking element 76 adjacent the first contact element 50, such that a clamping force is selectively applied to and released from both the first and second contact elements 50, 52 when the sleeve 44 is moved between the clamping and open positions.

As illustrated in FIG. 6, the locking element 76 is in the form of a ball and thus the locking element 76, spindle collar 54 and sleeve 44 together can form a ball lock for selectively clamping the electrode 16 between the first and second contact elements 50, 52. Alternatively, the locking element 76 can be in the form of a resilient element having a projection that extends through the aperture 74, similar to a spring lock design. In the spring lock design, the sleeve 44 applies a force against the resilient element which presses the locking element projection against the second contact element 52. When the sleeve 44 is in the open position, the force on the resilient element is decreased enough to allow the resilient element to expand, withdrawing the projection away from the second contact element 52, thereby releasing the clamping pressure on the second contact element 52.

III. Conclusion

The embodiments described herein provide for a pneumatically actuated electrode holder that clamps and unclamps an electrode with spring force without the use of tools. In contrast to traditional electrode chucks which require the use of tools to clamp and unclamp the chuck and are often removed from the EDM for loading and unloading electrodes, the designs described herein allow for the use of a permanently mounted electrode holder that does not require separate tools to use. The use of spring force for biasing the sleeve into the clamping position, rather than relying on the user to tighten and/or loosen the electrode holder, reduces the risk of damaging the electrode from over or under-tightening the holder. Providing a groove in at least one of the contact elements can facilitate centering the electrode within the spindle in addition to improving the clamping pressure applied to the electrode.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The embodiments of the invention in which an exclusive property or privilege is claimed are defined as follows:

1. An electrical discharge machining (EDM) spindle for releasably holding an electrode, the spindle comprising:
    an elongated spindle body having a longitudinal axis;
    a movable sleeve surrounding the spindle body and extending along the longitudinal axis;
    a first contact element having a first electrode clamping surface;
    a second contact element having a second electrode clamping surface adjacent the first electrode clamping surface of the first contact element;
    a locking element that is actuated by the sleeve to selectively apply pressure to at least one of the first and second contact elements;
    wherein the sleeve is moveable along the longitudinal axis between (a) an open position in which the sleeve releases a pressure applied to the locking element, thereby releasing a pressure applied to the first and second electrode clamping surfaces of the first and second contact elements and (b) a clamping position in which the sleeve applies pressure to the locking element to force the locking element against at least one of the first and second contact elements to clamp the electrode between the first and second electrode clamping surfaces; and
    a biasing element biasing the sleeve into the clamping position.

2. The spindle of claim 1 wherein the locking element comprises one of a ball, a pin, or a spring.

3. The spindle of claim 1 wherein one of the first and second electrode clamping surfaces comprises a groove extending along the longitudinal axis and the other of the first and second electrode clamping surfaces comprises a planar surface, wherein the groove is configured to receive the electrode therein.

4. The spindle of claim 1 further comprising an electrode guide configured to guide the electrode toward the first and second electrode clamping surfaces.

5. The spindle of claim 1 further comprising a pneumatic cylinder configured to move the sleeve into the open position against the biasing of the biasing element.

6. The spindle of claim 1 further comprising an electrode seal having a passageway for receiving the electrode, wherein pressure from a supply of flushing fluid to the spindle seals the electrode seal around the electrode.

7. An electrical discharge machining (EDM) spindle for releasably holding an electrode, the spindle comprising:
    an elongated spindle body having a longitudinal axis;
    a movable sleeve surrounding the spindle body and extending along the longitudinal axis;
    a first contact element having a first electrode clamping surface comprising a planar surface;
    a second contact element having a second electrode clamping surface comprising a groove extending along the longitudinal axis and configured to receive the electrode therein, the second electrode clamping surface adjacent the first electrode clamping surface of the first contact element;

wherein the sleeve is moveable along the longitudinal axis between (a) an open position in which the sleeve releases a pressure applied to at least one of the first and second contact elements to release the planar surface of the first contact element from the second electrode clamping surface and (b) a clamping position in which the sleeve applies pressure to at least one of the first and second contact elements to clamp the electrode between the planar surface of the first contact element and the groove of the second contact element; and a biasing element biasing the sleeve into the clamping position.

8. The spindle of claim 7 further comprising a locking element that is actuated by the sleeve to selectively apply pressure to at least one of the first and second contact elements, wherein in the clamping position, the sleeve applies pressure to the locking element to force the locking element against at least one of the first and second contact elements, and wherein in the open position, the sleeve releases the pressure applied to the locking element.

9. The spindle of claim 8 wherein the locking element comprises one of a ball, a pin, or a spring.

10. The spindle of claim 7 further comprising an electrode guide configured to guide the electrode toward the first and second electrode clamping surfaces.

11. The spindle of claim 7 further comprising a pneumatic cylinder configured to move the sleeve into the open position against the biasing of the biasing element.

12. The spindle of claim 7 further comprising an electrode seal having a passageway for receiving the electrode, wherein pressure from a supply of flushing fluid to the spindle seals the electrode seal around the electrode.

13. A method of releasably holding an electrode in an electrical discharge machining (EDM) spindle, the spindle comprising an elongated spindle body, a moveable sleeve surrounding the spindle body, a pair of contact elements configured to hold the electrode in the spindle, and a locking element selectively applying pressure to the pair of contact elements, the method comprising:

moving the sleeve relative to the spindle body along a longitudinal axis of the spindle body into an open position, wherein in the open position the sleeve releases a pressure applied by the locking element to the pair of contact elements to thereby release the pair of contact elements;

inserting the electrode between the pair of contact elements;

moving the sleeve along the longitudinal axis into a clamping position to increase a pressure applied to the locking element which forces the locking element against at least one of the pair of contact elements, the increased pressure moving at least one of the pair of contact elements toward the other to clamp the electrode;

subsequent to clamping the electrode, moving the sleeve into the open position again to decrease the pressure applied by the locking element to the pair of contact elements to release the electrode clamped between the pair of contact elements; and biasing the sleeve into the clamping position.

14. The method of claim 13 wherein at least one of the pair of contact elements comprises a planar clamping surface and the other of the pair of contact elements comprises a clamping surface having a groove extending along the longitudinal axis, the groove configured to receive the electrode inserted between the pair of contact elements.

15. The method of claim 13 wherein the locking element comprises one of a ball, a pin, or a spring that selectively applies pressure to the pair of contract elements.

16. The method of claim 13 further comprising pneumatically moving the sleeve from the clamping position into the open position against the biasing.

17. The method of claim 13 further comprising inserting the electrode through an electrode guide aligned with the pair of contact elements.

* * * * *